(12) United States Patent
Hui

(10) Patent No.: US 7,495,414 B2
(45) Date of Patent: Feb. 24, 2009

(54) RECHARGEABLE BATTERY CIRCUIT AND STRUCTURE FOR COMPATIBILITY WITH A PLANAR INDUCTIVE CHARGING PLATFORM

(75) Inventor: Ron Shu-yuen Hui, Shatin (CN)

(73) Assignee: Convenient Power Limited, Central (HK)

( * ) Notice: Subject to any disclaimer, the term of this patent is extended or adjusted under 35 U.S.C. 154(b) by 0 days.

(21) Appl. No.: 11/234,045

(22) Filed: Sep. 23, 2005

(65) Prior Publication Data

US 2007/0029965 A1 Feb. 8, 2007

Related U.S. Application Data

(63) Continuation-in-part of application No. 11/189,097, filed on Jul. 25, 2005.

(51) Int. Cl.
*H02J 7/00* (2006.01)
(52) U.S. Cl. .................. 320/108; 107/113; 107/115; 107/114; 107/112
(58) Field of Classification Search .............. 320/108; 336/117
See application file for complete search history.

(56) References Cited

U.S. PATENT DOCUMENTS

| | | | | |
|---|---|---|---|---|
| 6,016,046 A * | 1/2000 | Kaite et al. | ............ | 320/108 |
| 6,140,902 A * | 10/2000 | Yamasawa et al. | ............ | 336/83 |
| 6,501,364 B1 | 12/2002 | Hui et al. | ............ | 336/200 |
| 2002/0089305 A1* | 7/2002 | Park et al. | ............ | 320/108 |
| 2002/0110013 A1 | 8/2002 | Park et al. | ............ | 363/153 |
| 2003/0151930 A1* | 8/2003 | Berghegger | ............ | 363/21.02 |
| 2003/0210106 A1* | 11/2003 | Cheng et al. | ............ | 333/24 R |
| 2003/0214821 A1* | 11/2003 | Giannopoulos et al. | .. | 363/21.02 |

(Continued)

FOREIGN PATENT DOCUMENTS

CN 245808 1/1997

(Continued)

OTHER PUBLICATIONS

Tang, S.C.; Chung, H., "Coreless printed-circuit board transformers for signal and energy transfer," *Electronics Letters*, vol. 34 Issue: 11, May 28, 1998, pp. 1052-1054.

(Continued)

*Primary Examiner*—Edward Tso
*Assistant Examiner*—Alexis Boateng
(74) *Attorney, Agent, or Firm*—Heslin Rothenberg Farley & Mesiti P.C.

(57) ABSTRACT

A battery pack for an electronic device comprises battery cells, a battery charging circuit, and an energy receiving element adapted to receive power from a planar inductive charging system. The energy receiving element has an inductance and a capacitor is connected to the energy receiving element and forms a resonant tank therewith. A diode rectifier and a DC capacitor are connected to the energy receiving element to provide a rectified DC voltage that can be fed from the energy receiving element to said battery charging circuit. The energy receiving element may comprise a soft magnetic sheet with a coil wound around its edges, or a coil formed on a printed circuit board, or a combination of the two. The energy receiving element may be formed integrally with the battery pack, or may be provided as a separate component that can be added to an existing battery.

33 Claims, 13 Drawing Sheets

U.S. PATENT DOCUMENTS

| | | | |
|---|---|---|---|
| 2005/0017677 A1* | 1/2005 | Burton et al. | 320/108 |
| 2005/0140482 A1* | 6/2005 | Cheng et al. | 336/180 |
| 2006/0061326 A1* | 3/2006 | Vine et al. | 320/108 |

FOREIGN PATENT DOCUMENTS

| | | |
|---|---|---|
| CN | 136940 A | 8/2002 |
| EP | 0935263 | 8/1999 |
| FR | 2 796 216 | 1/2001 |
| GB | 2 399 225 A | 9/2004 |
| JP | 10-75085 | 3/1998 |
| JP | 11-16756 | 1/1999 |
| WO | WO 03/105308 A1 | 12/2003 |

OTHER PUBLICATIONS

Hui, S.Y.R.; Henry Shu-Hung Chung; Tang, S.C., "Coreless printed circuit board (PCB) transformers for power MOSFET/IGBT gate drive circuits," *IEEE Transactions on Power Electronics*, vol. 14 Issue: 3, May 1999, pp. 422-430.

Tang, S.C.; Hui, S.Y.R.; Henry Shu-Hung Chung, "Coreless printed circuit board (PCB) transformers with multiple secondary windings for complementary gate drive circuits," *IEEE Transactions on Power Electronics*, vol. 14, Issue: 3, May 1999, pp. 431-437.

Hui, S.Y.R.; Tang, S.C.; Henry Shu-Hung Chung, "Optimal operation of coreless PCB transformer-isolated gate drive circuits with wide switching frequency range," *IEEE Transactions on Power Electronics*, vol. 14 Issue: 3, May 1999, pp. 506-514.

Tang, S.C.; Hui, S.Y.R.; Henry Shu-Hung Chung, "Coreless planar printed-circuit-board (PCB) transformers—a fundamental concept for signal and energy transfer," *IEEE Transactions on Power Electronics*, vol. 15 Issue: 5, Sep. 2000, pp. 931-941.

Choi B., Nho J., Cha H. and Choi S.:, "Design and implementation of low-profile contactless battery charger using planar printed circuit board windings as energy transfer device," *IEEE Transactions on Industrial Electronics*, vol. 51, No. 1, Feb. 2004, pp. 140-147.

* cited by examiner

RECHARGEABLE BATTERY CIRCUIT AND STRUCTURE FOR COMPATIBILITY WITH A PLANAR INDUCTIVE CHARGING PLATFORM

CROSS-REFERENCE TO RELATED APPLICATIONS

This application is a continuation-in-part of U.S. patent application Ser. No. 11/189,097, filed Jul. 25, 2005, which is hereby incorporated herein by reference in its entirety.

FIELD OF THE INVENTION

This invention relates to rechargeable batteries for use in portable electronic devices, and in particular to a battery circuit and structure for use in a device intended to be used with a planar inductive charging platform.

BACKGROUND OF THE INVENTION

Portable electronic equipment such as mobile phones and personal digital assistants (PDA) usually use rechargeable batteries. Power adaptors (or AC-DC power converters) are traditionally used to charge the batteries in the electronic equipment. Due to the wide range of portable electronic products, many people nowadays have a wide range of power adaptors because there is no standard for charging different types of portable electronic equipment.

Figure 1A:
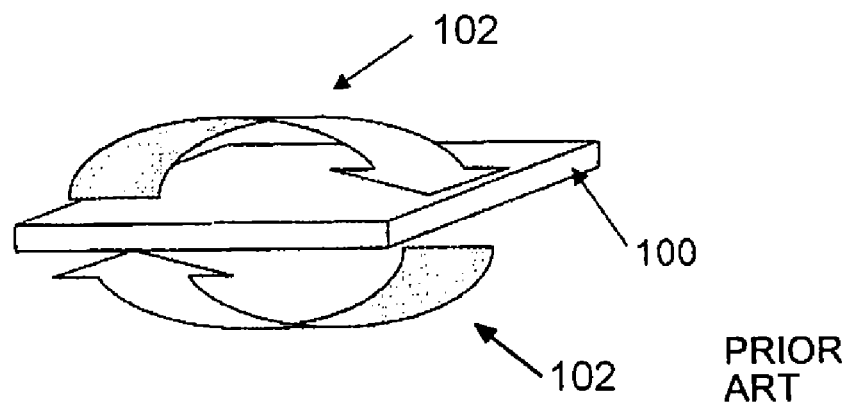
Figure 1B:
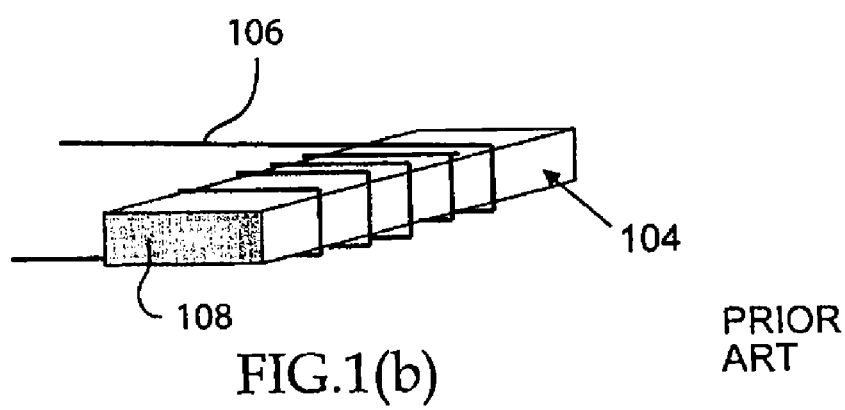

Recently, two proposals for planar inductive charging platforms have been proposed. The first one 100 proposed in patent application GB2399225A generates an AC electromagnetic flux with the flux lines 102 flowing "horizontally" along the charging surfaces 102 as shown in FIG. 1a. A distributed winding is used in this charging platform for generating the AC flux. This principle is in fact similar to the AC electromagnetic flux generated in a cylindrical motor, except that the cylindrical structure is compressed into a flat pancake shape. As the flux needs to flow horizontally along the upper and lower surfaces, two inherent limitations arise. Firstly, an electromagnetic flux guide must be used to guide the flux along the bottom surface. This is usually a layer of soft magnetic material such as ferrite or amorphous alloy. In order to provide sufficient flux, this layer must be "thick" enough so that the flux can pass along the layer of soft magnetic material without magnetic saturation. Secondly, a similar problem applies to the secondary device that has to pick up flux (and energy) on the upper surface of the charging platform. FIG. 1b shows the device required for the charging platform of FIG. 1a. It consists of a magnetic core 104 and a winding 106. In order for the winding to sense the AC flux, the flux must flow into the cross-sectional area 108. Therefore, this cross-sectional area must be large enough so that enough flux and energy can be picked up by the secondary device. It should be noted that this secondary device must be housed inside the electronic equipment to be charged on the charging platform. The thickness of the secondary device is crucial to the applicability and practicality of the device. If it is too thick, it simply cannot be housed in the electronic equipment.

Figure 2:
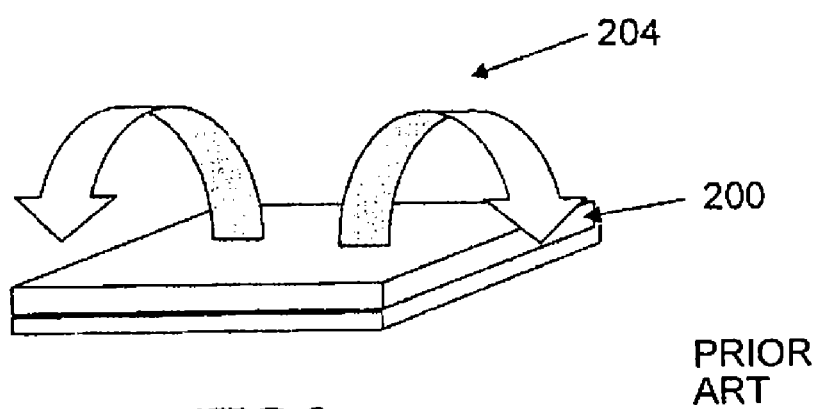

Another planar inductive battery charging platform was proposed in WO03/105308. Unlike GB2399225A, the charging platform 200 proposed in WO03/105308 uses a multi-layer planar winding array to generate an AC flux that has almost uniform magnitude over the entire charging surface. The lines of flux 204 of this charging platform flow "perpendicularly" in and out of the charging surfaces (FIG. 2). This perpendicular flow of flux is very beneficial because it allows the energy transfer over the surface on which the electronic equipment (to be charged) is placed.

For both planar charging platforms described above, it is necessary to use an electromagnetic shield on the bottom surface. If the charging platform is placed on a metallic desk, the AC flux generated in the charging platform may induce currents in the metallic desk, resulting in incorrect energy transfer and even heating effects in the metallic desk. U.S. Pat. No. 6,501,364 describes an effective electromagnetic shield for this type of planar charging platform. The electromagnetic shield of U.S. Pat. No. 6,501,364 simply consists of a thin layer of soft magnetic material (such as ferrite) and a thin layer of conductive material (such as copper).

Regarding energy transfer from the planar surface, one coreless printed-circuit-board (PCB) transformer technology pioneered by Hui and Tang has been proven to be an effective technique (see for example: EP935763A: Hui, S. Y. R.; Tang, S. C.; Chung, H., 'Coreless printed-circuit board transformers for signal and energy transfer', *Electronics Letters*, Volume: 34 Issue: 11, 28 May 1998, Page(s): 1052-1054; Hui, S. Y. R.; Henry Shu-Hung Chung; Tang, S. C., 'Coreless printed circuit board (PCB) transformers for power MOSFET/IGBT gate drive circuits', *IEEE Transactions on Power Electronics*, Volume: 14 Issue: 3, May 1999, Page(s): 422-430; Tang, S. C.; Hui, S. Y. R.; Henry Shu-Hung Chung, 'Coreless printed circuit board (PCB) transformers with multiple secondary windings for complementary gate drive circuits', *IEEE Transactions on Power Electronics*, Volume: 14 Issue: 3, May 1999, Page(s): 431-437; Hui, S. Y. R.; Tang, S. C.; Henry Shu-Hung Chung, 'Optimal operation of coreless PCB transformer-isolated gate drive circuits with wide switching frequency range', *IEEE Transactions on Power Electronics*, Volume: 14 Issue: 3, May 1999, Page(s): 506-514; and Tang, S. C.; Hui, S. Y. R.; Henry Shu-Hung Chung, 'Coreless planar printed-circuit-board (PCB) transformers—a fundamental concept for signal and energy transfer', IEEE Transactions on Power Electronics, Volume: 15 Issue: 5, September 2000, Page(s): 931-941.

Figure 3:
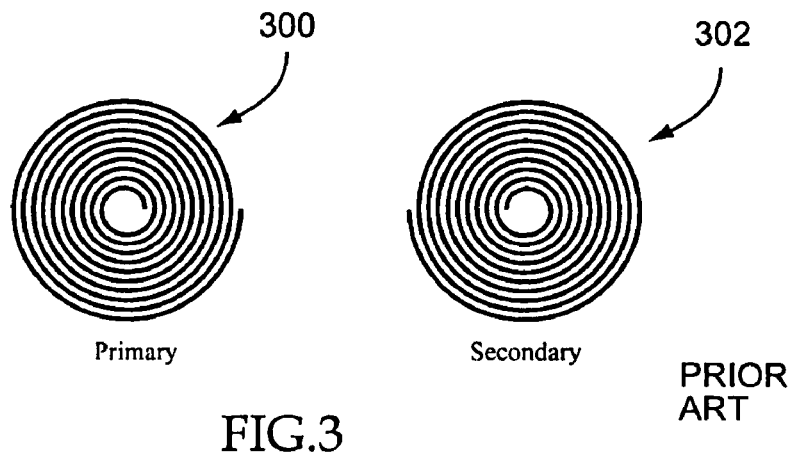
Figure 4A:
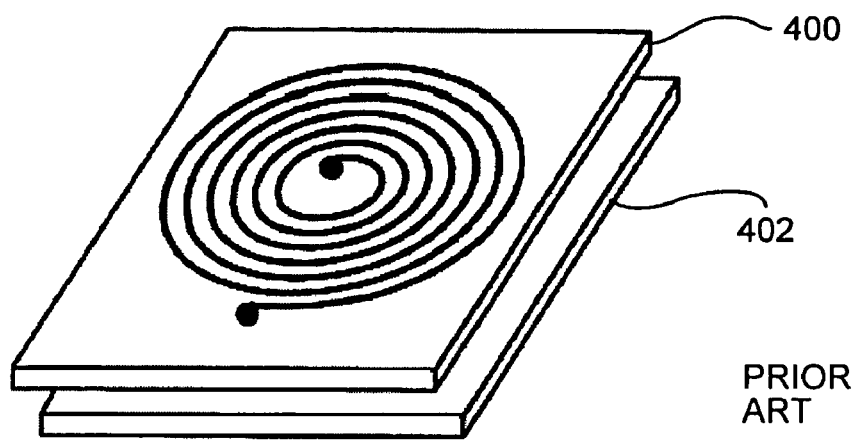
Figure 4B:
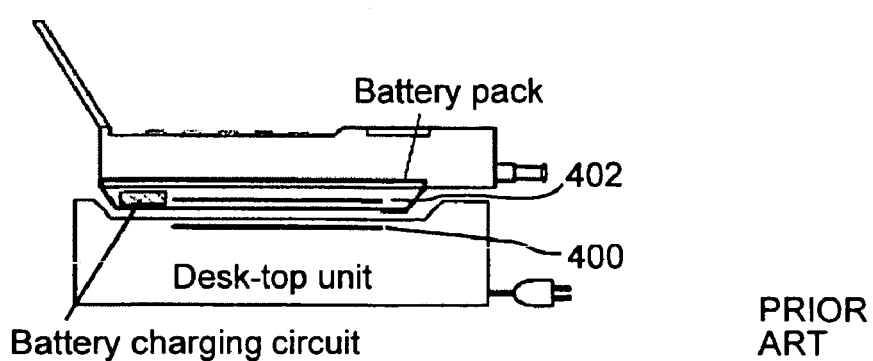
Figure 5:
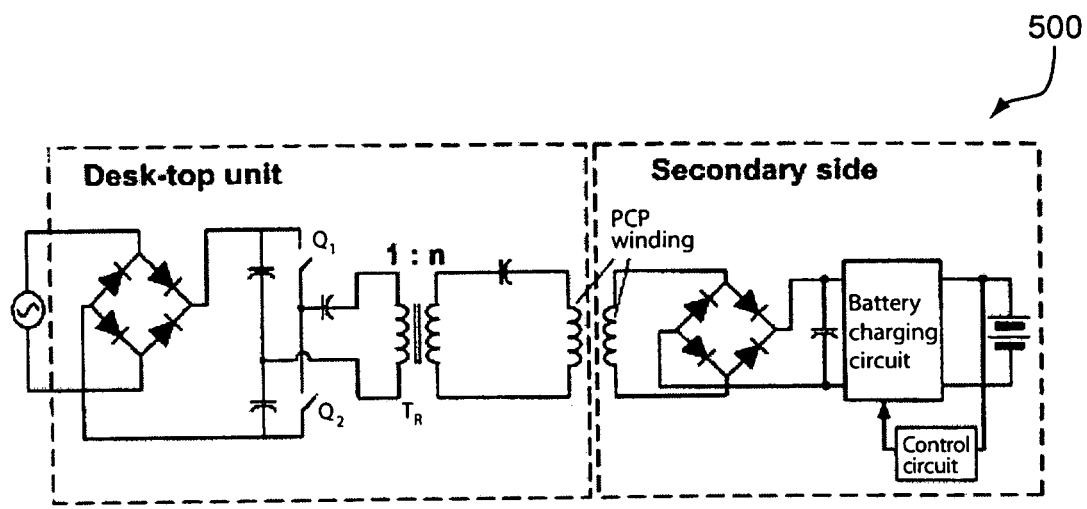

Based on two planar windings 300 and 302 on two parallel planes as shown in FIG. 3, it has been shown that both energy and signal can be transferred from one planar winding to another. This planar PCB transformer technology has been applied in a range of applications. In 2004, it was used for a contactless battery charger for mobile phones (Choi B., Nho J., Cha H. and Choi S.:, 'Design and implementation of low-profile contactless battery charger using planar printed circuit board windings as energy transfer device', *IEEE Transactions on Industrial Electronics*, vol. 51, No. 1, February 2004, pp. 140-147). Choi uses one planar winding 400 as a primary charging pad and a separate planar winding 402 as a secondary winding as shown in FIGS. 4a and 4b. FIG. 5 shows the equivalent electrical circuit diagram 500 of this contactless charging system. It should be noted that the primary circuit is based on the resonant circuit described by Hui and Tang, while the front power stage of the secondary circuit is a standard winding with a diode rectifier that provides the rectified DC voltage for the charging circuit.

Two main problems suffered by the prior art charging system of FIG. 5 include:

(1) The planar winding of the secondary module must be placed directly on top of the planar winding of the primary unit. If it is slightly misplaced, the energy transfer will be seriously hampered.

(2) The use of one spiral planar winding in the secondary module to pick up energy emitted from the primary winding requires the choice of switching frequency to be very high (eg 950 kHz). Such high switching frequency leads to high switching loss in the primary inverter circuit, high AC resistance in the PCB copper tracks and more importantly high electromagnetic interference (EMI) emission.

Problem (1) can be solved by using a planar inductive charging platform based on a multilayer planar winding array structure, which allows the charged electronic equipment to be placed anywhere on the charging surface as described in WO03/105308. The present invention addresses problem (2) and provides a simple and more effective secondary device to enable energy transfer between the primary planar charging platform and the secondary module more effectively at a much lower operating frequency (eg as low as 100 kHz).

SUMMARY OF THE INVENTION

According to the present invention there is provided a battery pack for an electronic device comprising: battery cells, a battery charging circuit, an energy receiving element adapted to receive power from a planar inductive charging system, said energy receiving element having an inductance, an AC capacitor connected to said energy receiving element and forming a resonant tank therewith, and a diode rectifier and a DC capacitor connected to the energy receiving element to provide a rectified DC voltage that can be fed from the energy receiving element to said battery charging circuit.

Preferably the energy receiving element comprising a generally planar thin soft magnetic sheet and a first coil wound around the edge of said sheet such that the coil lies in a plane defined by the magnetic sheet. In such an embodiment the AC capacitor may be connected in series with the first coil forming a resonant tank with the first coil and the magnetic sheet. The diode rectifier may be either a standard diode rectifier or a voltage doubler. The output of the rectifier can preferably be fed to a dc-DC voltage regulator which provides a stable voltage for charging the battery.

In some embodiments of the invention the diode rectifier and the capacitor are formed as part of the battery charging circuit.

Preferably there may be provided a secondary energy receiving element comprising a second coil formed in a plane parallel to the soft magnetic sheet and wherein the second coil is connected in parallel with the first coil. This second coil may be formed on a printed circuit board which may be fixed to said soft magnetic sheet.

In another embodiment of the invention the energy receiving element may comprise a coil formed on a printed circuit board.

According to another aspect of the invention there is provided an electronic device powered by a battery pack, said battery pack comprising battery cells and a battery charging circuit, said device comprising a housing, means for connecting said battery charging circuit to an external power adaptor, and said device further comprising an energy receiving element adapted to receive power from a planar inductive charging system and for supplying power to said battery charging circuit, said energy receiving element having an inductance, and an AC capacitor connected to said energy receiving element and forming a resonant tank therewith.

Preferably the energy receiving element comprises a generally planar thin soft magnetic sheet located on a side of the battery pack facing a side of the housing adapted to be received on a planar inductive charging system and a first coil wound around the edge of the sheet such that the coil lies in a plane defined by said magnetic sheet. In such an embodiment the AC capacitor may be connected in series with the first coil forming a resonant tank with the first coil and the magnetic sheet. The diode rectifier may be either a standard diode rectifier or a voltage doubler.

In some embodiments of the invention the diode rectifier and the capacitor are formed as part of the battery charging circuit.

Preferably there may be provided a secondary energy receiving element comprising a second coil formed as a spiral in a plane parallel to the soft magnetic sheet and wherein the second coil is connected in parallel with the first coil. This second coil may be formed on a printed circuit board which may be fixed to said soft magnetic sheet.

In another embodiment of the invention the energy receiving element may comprise a coil formed on a printed circuit board.

According to a further aspect of the present invention there is provided an energy receiving element adapted to be fixed to a battery pack to enable said battery pack to be charged from a planar inductive battery charging system, said energy receiving element having an AC capacitor, wherein said energy receiving element has an inductance and forms a resonant tank with an AC capacitor.

According to a still further aspect of the present invention there is provided an energy receiving element adapted to be fixed to a battery pack to enable said battery pack to be charged from a planar inductive battery charging system, said energy receiving element comprising a generally planar thin soft magnetic sheet and a first coil wound around the edge of said sheet such that the coil lies in a plane defined by said magnetic sheet.

Preferably the energy receiving element further comprises an AC capacitor connected in series with the first coil and forming a resonant tank with the first coil and the magnetic sheet.

The energy receiving element may further comprise a diode rectifier and a DC capacitor connected to the first coil to provide a rectified DC voltage that can be fed from the energy receiving element to a battery charging circuit of the battery pack. The diode rectifier may be a standard diode or a voltage doubler.

In a preferred embodiment the energy receiving element may further comprise a second coil formed as a spiral in a plane parallel to the soft magnetic sheet and wherein the second coil is connected in parallel with the first coil. This second coil may be formed on a printed circuit board which may be fixed to the soft magnetic sheet.

A BRIEF DESCRIPTION OF THE DRAWINGS

Figure 6:
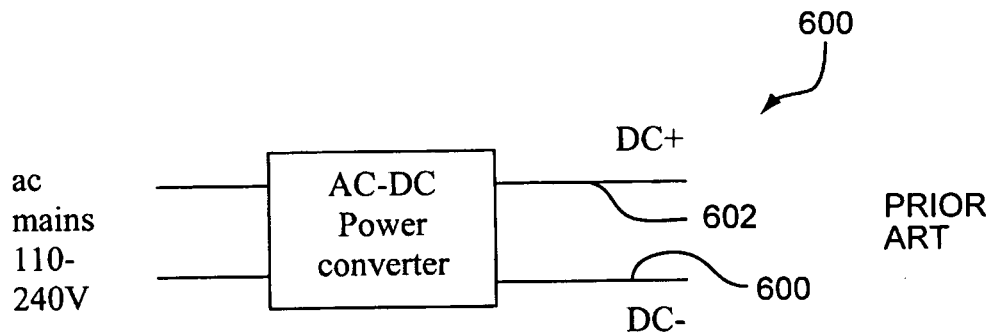
Figure 7:
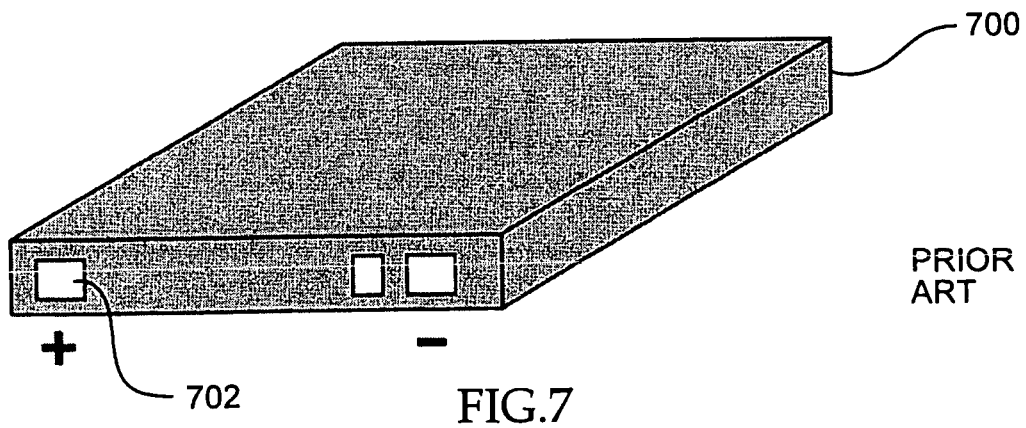
Figure 8:
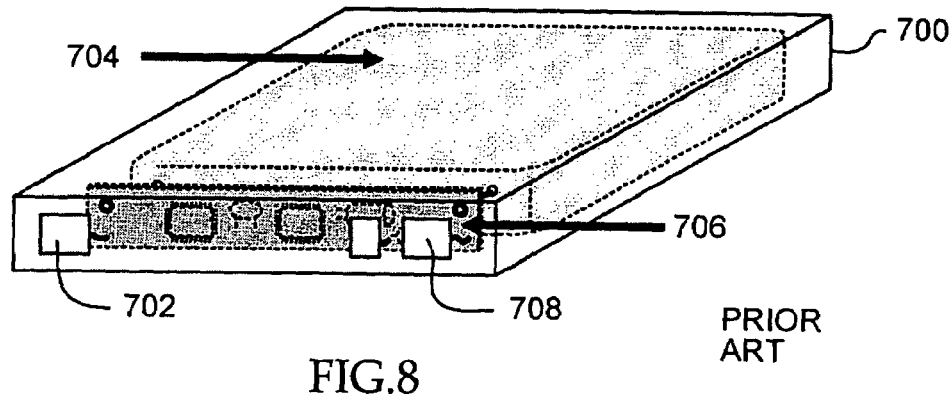
Figure 9:
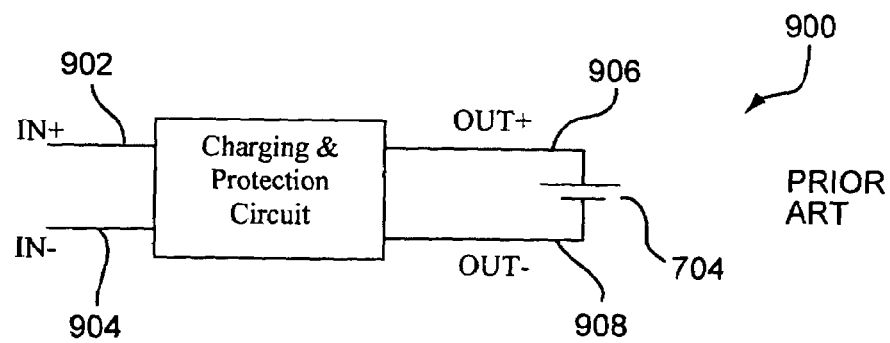
Figure 10:
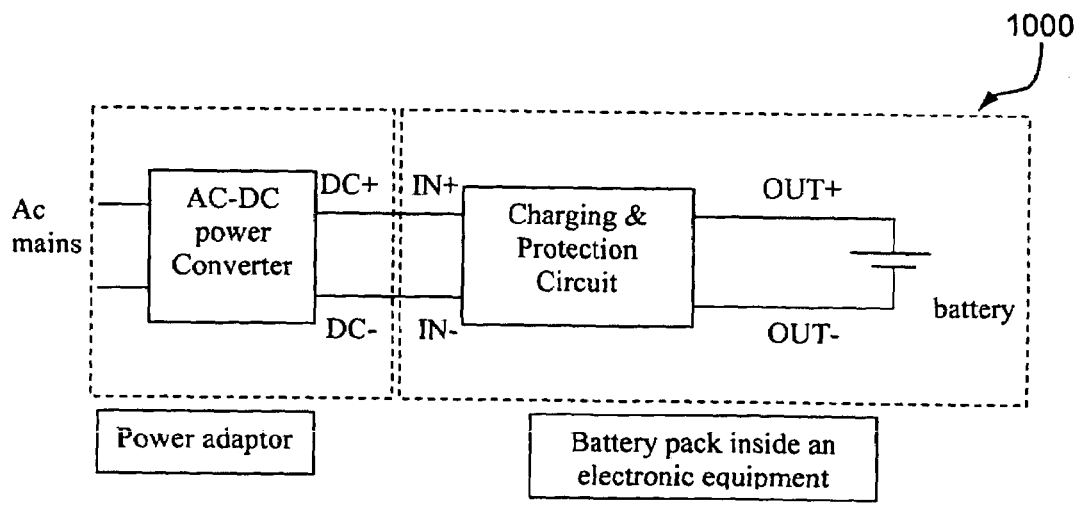
Figure 11A:
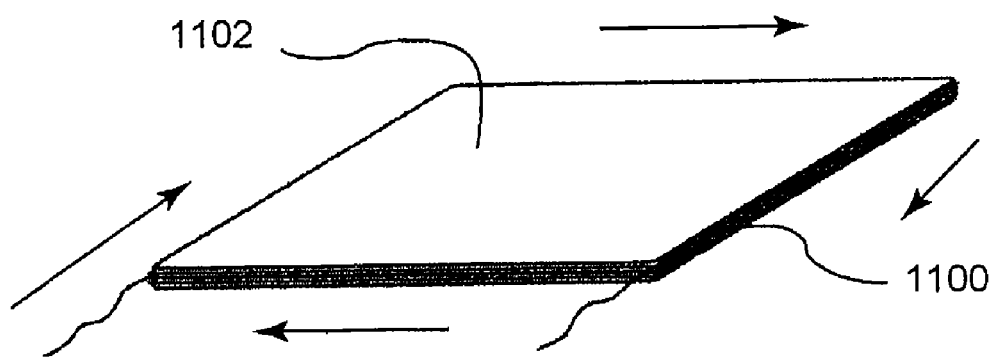
Figure 12A:
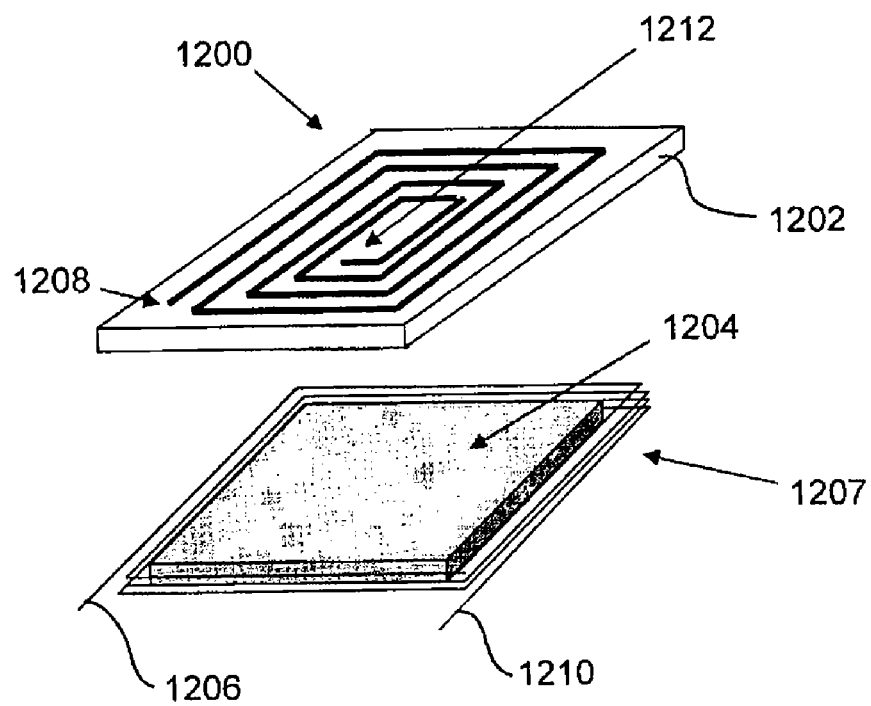
Figure 13A:
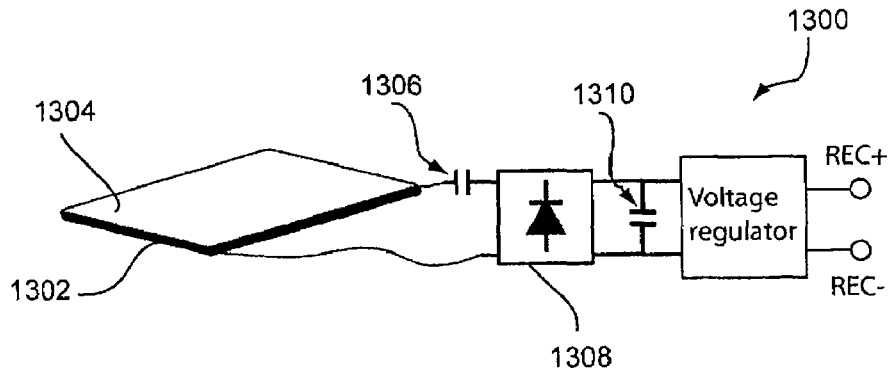
Figure 13:
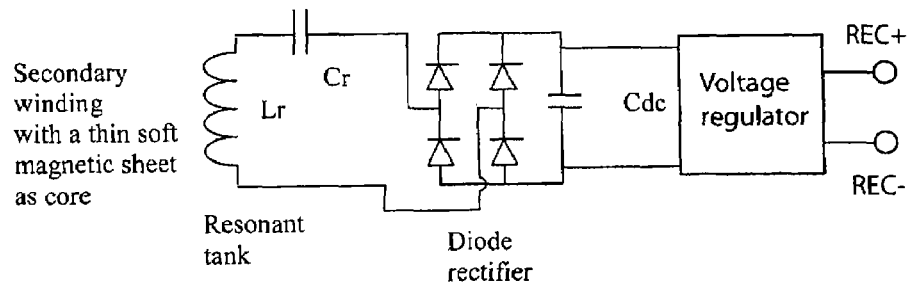
Figure 13C:
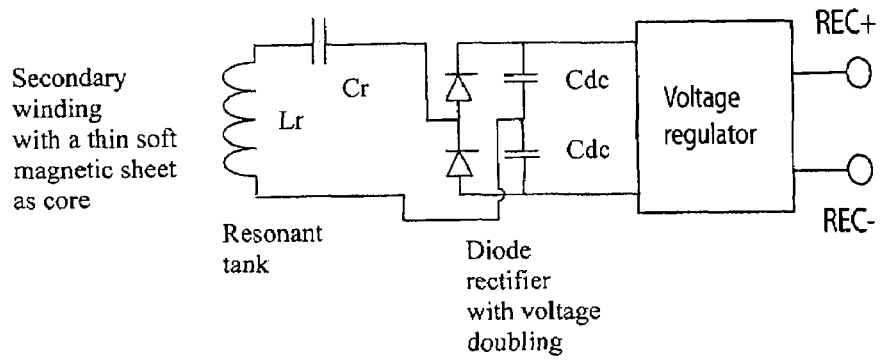
Figure 14:
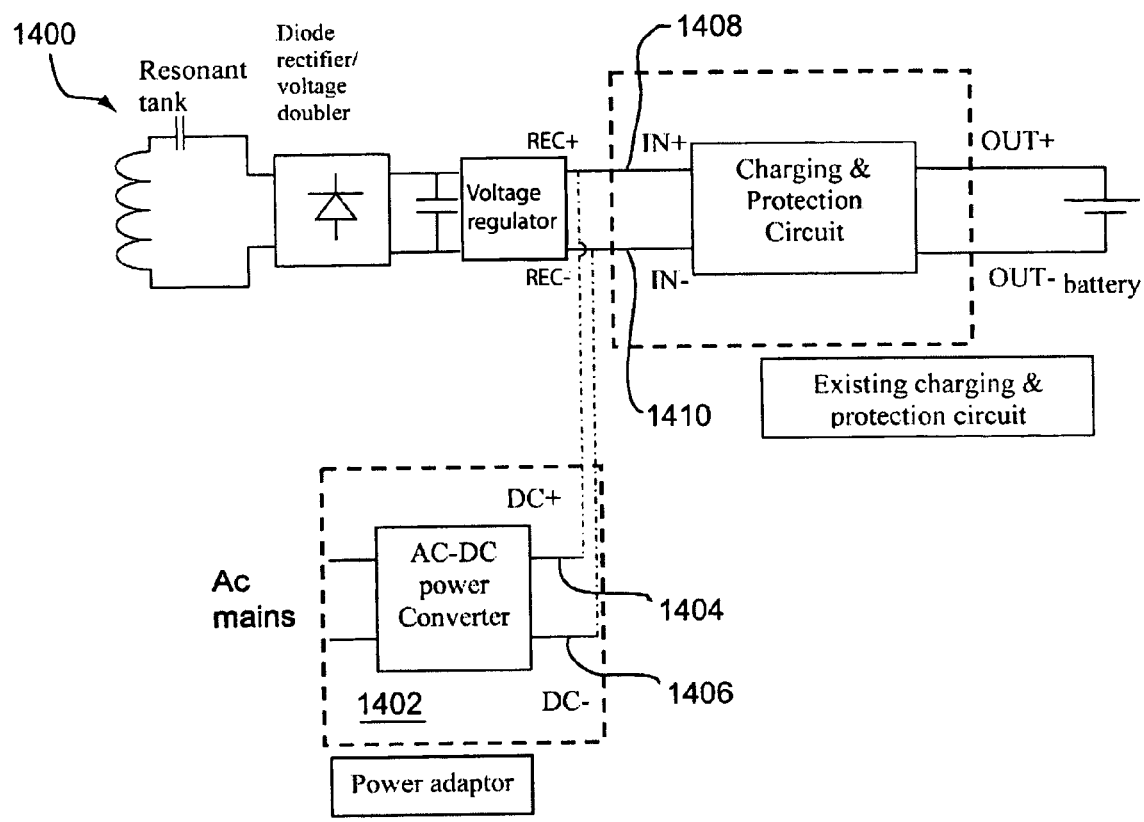
Figure 15:
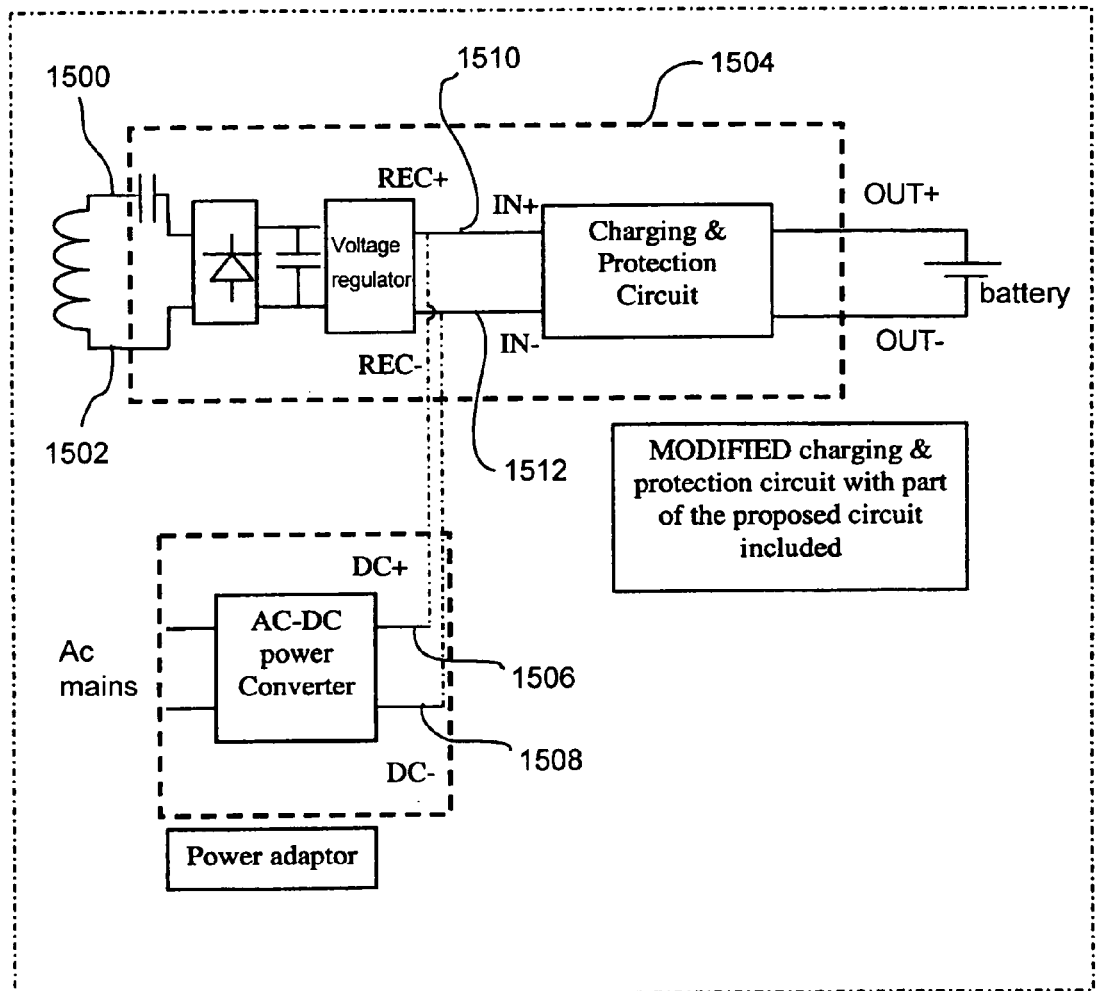
Figure 16:
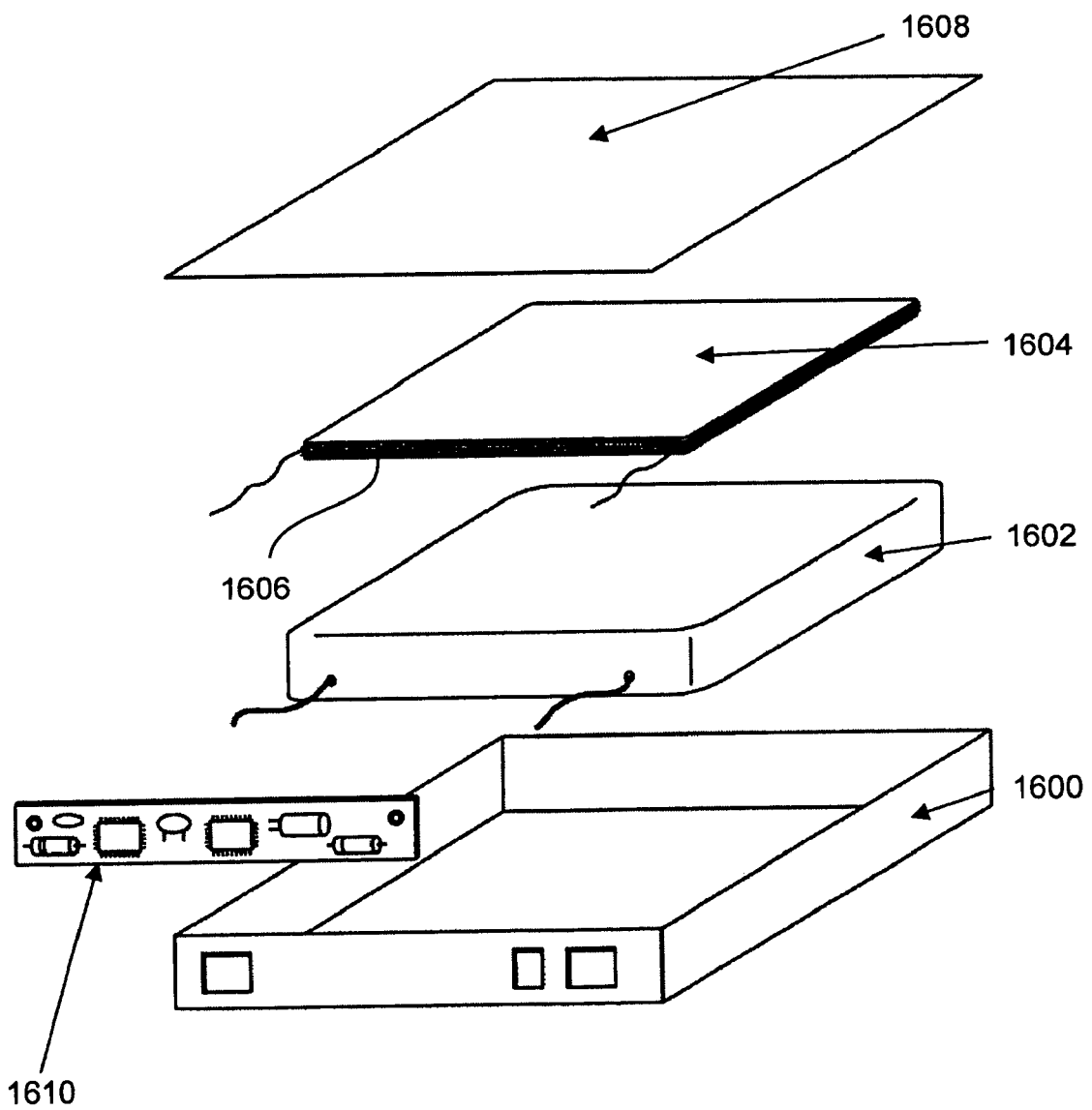
Figure 17A:
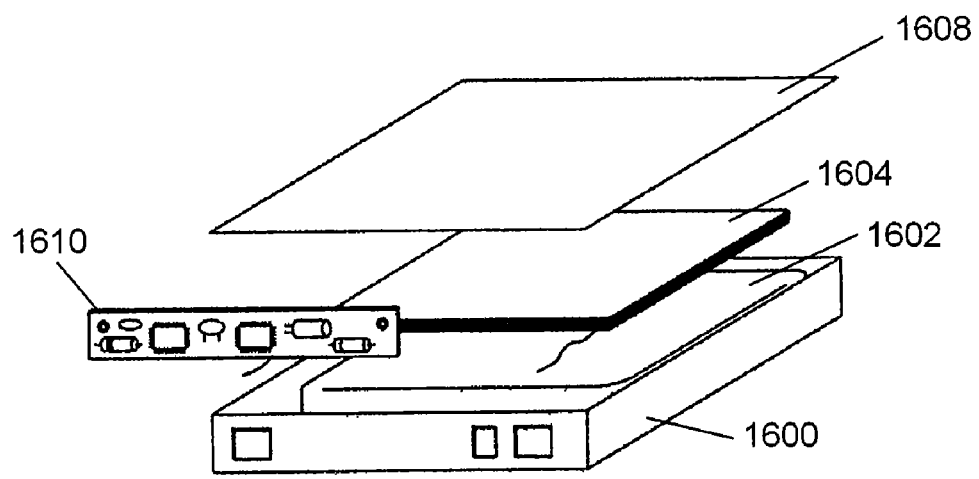
Figure 17B:
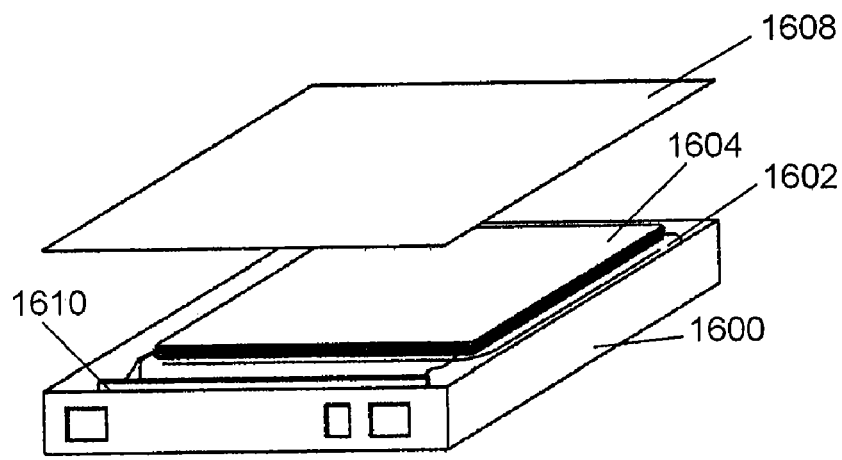
Figure 17C:
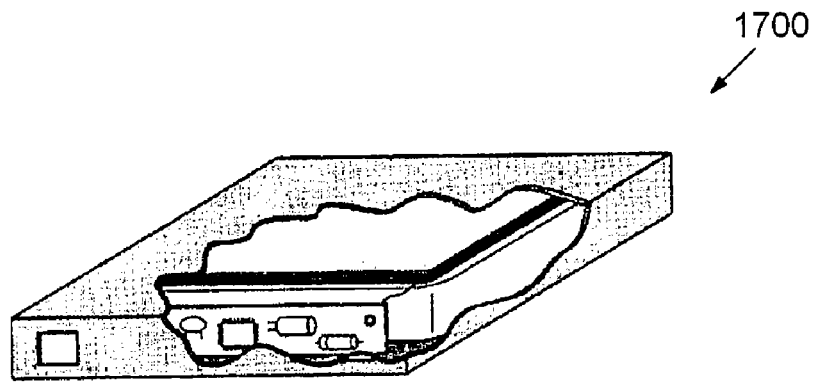
Figure 18:
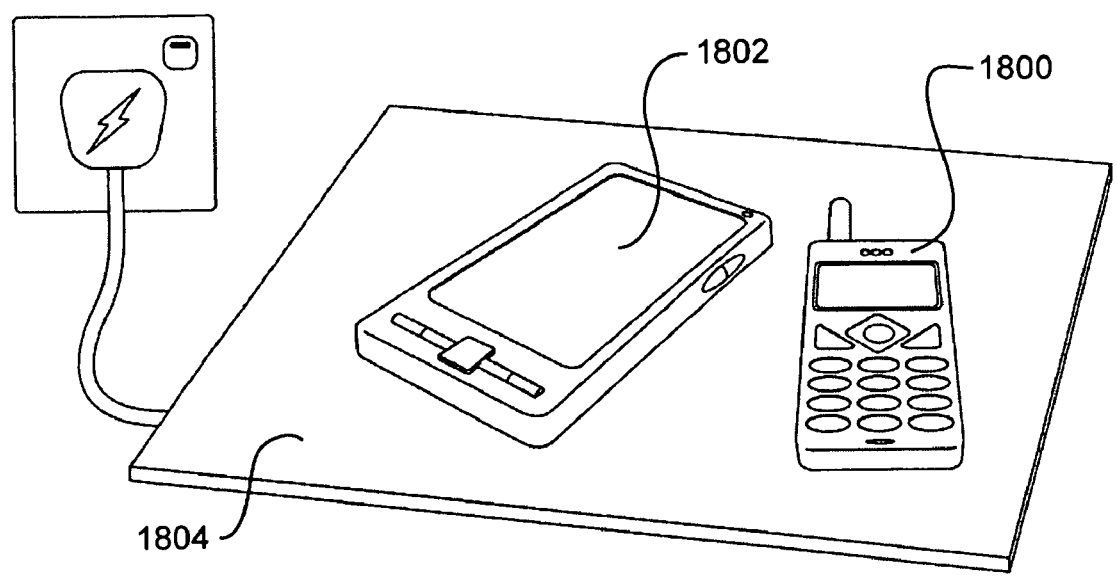
Figure 19:
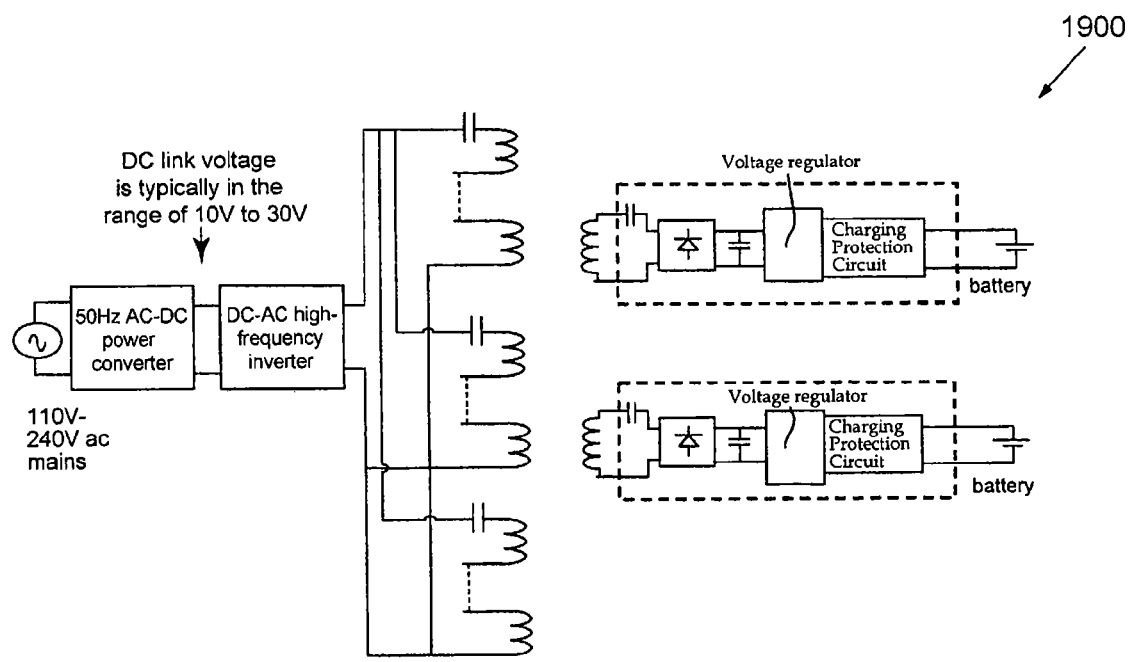

Some embodiments of the invention will now be described by way of example and with reference to the accompanying drawings, in which:

FIG. 1(a) and (b) show (a) an inductive battery charging platform and (b) a secondary device according to the prior art, FIG. 2 shows an inductive battery charging platform of the prior art with magnetic flux lines flowing in and out perpendicularly of the charging surface, FIG. 3 shows typical planar windings formed on the opposite sides of a printed circuit board in an energy transfer mechanism of the prior art, FIGS. 4(a) and (b) show (a) planar windings on two parallel planes and (b) their use in a contactless battery charging pad of the prior art, FIG. 5 shows the equivalent circuit of the system in FIG. 4(b), FIG. 6 shows a functional block diagram of a power adaptor of a traditional prior art battery charger, FIG. 7 shows a typical battery pack used in a portable electronic equipment such as a mobile phone, FIG. 8 shows the internal structure of the battery pack of FIG. 7, consisting of an electric cell (or battery) and a charging protection circuit, FIG. 9 shows a functional block diagram of the battery pack of FIGS. 7 and 8, FIG. 10 shows a functional block diagram of a prior art power adapter connected to a battery pack inside a charged electronic equipment, FIG. 11(a) and (b) show (a) a thin soft magnetic sheet (square or rectangular or other polygonal shape) enclosed with a winding and (b) a thin soft magnetic sheet (circular or oval shape) to form an energy pick-up coil as well as an inductor in an embodiment of the invention, FIGS. 12(a) and (b) show an energy pick-up coil according to an embodiment of the invention consisting of a spiral winding and a concentrated winding connected in parallel, FIG. 13(a)-(c) show (a) a schematic diagram of an embodiment of the invention, (b) the circuit diagram of one embodiment of the invention, and (c) the circuit diagram of another embodiment of the invention, FIG. 14 shows a functional block diagram of the proposed circuit connected to a battery pack in a charged electronic equipment, FIG. 15 shows a functional block diagram of the proposed battery pack, with the resonant capacitor, the diode rectifier and the DC capacitor integrated into the existing charging protection circuit, FIG. 16 is an exploded view showing the major components of a proposed battery pack according to an embodiment of the invention for compatibility with a planar inductive charging platform, FIG. 17(a)-(c) show the assembly of the battery pack of FIG. 16, FIG. 18 illustrates the manner of charging electronic devices incorporating embodiments of the invention, and FIG. 19 shows the equivalent circuit of the primary circuit (planar inductive charger) and secondary loads (electronic equipment to be charged) in an embodiment of the invention.

DETAILED DESCRIPTION OF PREFERRED EMBODIMENTS

Traditional power adaptors (or battery chargers) for portable electronic equipment such as mobile phones and electronic organisers are essentially AC-DC power converters that change an AC mains voltage (typically 110V-240V) to a DC voltage (typically 3V to 12V). Most battery chargers for mobile phones provide a DC voltage of 4-6V. The functional block diagram 600 of a power adapter is shown in FIG. 6. When the power adaptor is plugged into the electronic equipment (to be charged), the two outputs DC+ 602 and DC− 604 are connected to the mechanical contacts of the charger socket of the electronic equipment.

FIG. 7 depicts a battery pack 700 with several external mechanical contacts (e.g., contact 702) that are accessible. Inside the battery pack are the electric "cells" 704 and a "charging protection circuit" 706 as shown in FIG. 8. Two mechanical contacts 702 and 708 are connected to the positive and negative terminals of the battery through the charging protection circuit. The cells form the battery and the charging protection circuit ensures that the battery is charged in a specified manner. FIG. 9 shows the functional block diagram 900 of the battery pack of FIGS. 7 and 8. The input positive and negative terminals of the charging protection circuit are labeled as IN+ 902 and IN− 904, respectively. The output positive and negative terminals of this circuit are labeled OUT+ 906 and OUT− 908, respectively. Output terminals 906 and 908 are connected to the battery as shown in FIG. 10. If the mechanical connector of the power adaptor is inserted into the charging socket of the electronic equipment, the equivalent block diagram 1000 is shown in FIG. 10, a combination of FIGS. 6 and 9. Essentially, DC+ and DC− are connected to IN+ and IN−, respectively.

According to a preferred embodiment of this invention, an energy receiving element in the form of a planar device is introduced to the battery pack structure of FIGS. 7-9 so that this battery pack can be charged inductively by a planar charging platform such as that in FIG. 2 (which has the magnetic flux lines flowing into and out of the charging surface perpendicularly). Using a mobile phone as an example, the battery pack is usually accommodated inside the mobile phone and is covered by the back cover of the mobile phone. If a mobile phone is placed on the planar inductive battery charging platform of FIG. 2, one side of the battery pack will face the charging surface of the charging platform. This side will be called the "active side" of the battery pack in this specification because it is closest to the charging surface of the charging platform and will be used for inductive charging purposes. There will be only the back cover (usually made of plastic) of the mobile phone between the active side of the battery pack and charging surface of the charging platform.

Figure 11B:
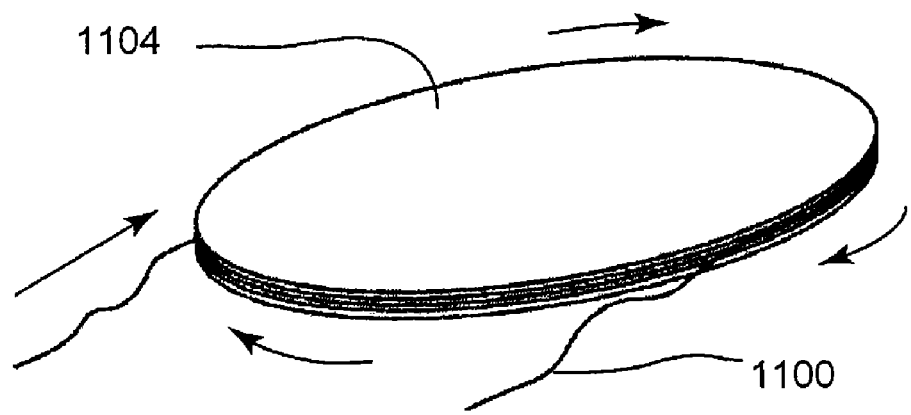

In a first embodiment of the invention shown in FIG. 13a, the energy receiving element 1300 comprises a winding 1302 wound around and within the thickness of a thin soft magnetic sheet 1304, a small AC capacitor 1306, a diode rectifier 1308 and a DC link capacitor 1310. The soft magnetic sheet may be, for example, square, rectangular or other polygonal shapes as shown in FIG. 11(a), or may be circular or oval as shown in FIG. 11(b). The winding and soft magnetic sheet form an energy pick-up coil or inductor as shown in FIG. 11(a) or 11(b), which then forms a resonant tank with the small resonant capacitor. When sensing a high-frequency AC magnetic flux flowing perpendicularly (or vertically) from the surface of the planar inductive battery charging platform, the energy pick-up coil will develop an AC voltage by Faraday's law and picks up the energy transmitted from a planar charging platform. This coil enclosing the soft magnetic sheet (as a low-profile magnetic core) is essentially a planar inductor. This planar inductor and the series-connected AC capacitor form a series resonant tank that can amplify the AC voltage for the diode rectifier. The diode rectifier and the DC capacitor rectify the AC voltage into a DC voltage that can be fed to a battery charging circuit. Preferably a voltage regulator can be used to provide a stable DC voltage from the output of the rectifier. The following sections describe the proposed low-profile device in more detail.

In order to effectively pick up the perpendicular AC magnetic flux generated by the planar inductive charging platform of FIG. 2, a planar winding 1100 with a certain number of turns (e.g., 12 turns) in the secondary module is wound around a thin sheet of soft magnetic material (1102, 1104) as shown in FIGS. 11(a) and 11(b). The height of this winding is less than the thickness of the soft magnetic sheet. This thin or low-profile structure can be placed or glued, for example, on the active side of the battery inside the battery pack. The thin soft magnetic sheet serves as a magnetic core for the winding and guides the perpendicular AC magnetic flux (generated by the charging platform) through the winding. It should be noted that the thickness of the soft magnetic sheet can be very small (e.g., 0.5 mm) because the cross-sectional area for the magnetic flux to flow is the large flat surface of the soft magnetic sheet (as the magnetic flux lines flow perpendicularly into and out of this flat surface). This highlights the huge advantage of the perpendicular flux generation of the inductive battery charging platform of WO03/105308 over the horizontal flux generation of GB2399225A. The "thin" structure of the proposed device of the present invention makes it easy to modify existing battery packs without substantially increasing the thickness of the battery pack. This makes it attractive for "low-profile" portable electronic equipment such as mobile phones.

It should be noted that while the present invention is particularly suited for use with the battery charging platform of WO03/105308 it is not limited to use with that platform and could be used with any battery charging platform in which the lines of flux extend generally perpendicular to the charging surface.

Figure 12B:
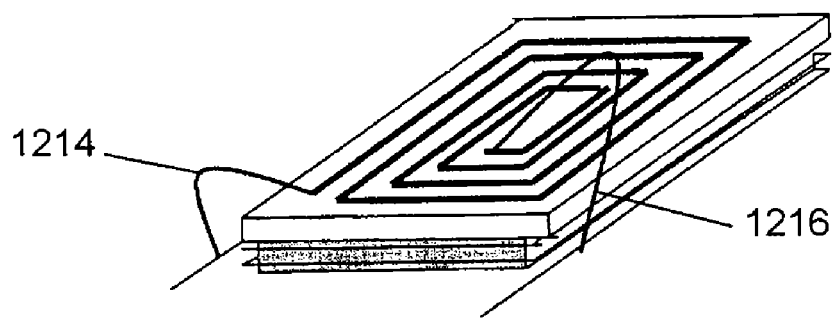

An alternative to the planar winding structures of FIGS. 11(a) and 11(b) is shown in FIGS. 12(a) and 12(b). A secondary energy receiving element may be added to the first energy receiving element. In particular, additional spiral windings can be added (connected in parallel) to the pick-up coil (i.e. the first winding that encloses the soft magnetic core) by printing one or more spiral windings 1200 on a printed circuit board (PCB) 1202 that is placed on top of a magnetic sheet 1204. The PCB is placed on the side of the magnetic sheet that in use would face the primary winding(s). It should also be noted that the PCB can be very thin (e.g., 0.2 mm) so the combination of the PCB and the magnetic sheet is still very thin. By connecting (1214) terminal 1208 of the additional winding to terminal 1206 of the first winding 1207, and connecting (1216) terminal 1212 of the additional winding to terminal 1210 of the first winding, as shown in FIG. 12b, the two windings are connected in parallel. The extra planar winding(s) can improve the energy pick-up in the secondary module.

It should also be noted that a coil formed on a printed circuit board in addition to acting as a secondary energy receiving element in the abovedescribed embodiment, may alternatively serve as a single energy receiving element on its own.

The secondary circuit used by Choi in the prior art can only pick up a sufficiently large voltage from the primary circuit at high frequency (950 kHz). The use of such high frequency leads to many shortcomings such as high AC resistance in the windings, reduced energy efficiency, high switching losses and high EMI emission in both primary and secondary circuits. Unlike the standard secondary winding used in this prior art, the winding of the present invention (FIGS. 11 and 12) serves as both an energy pick-up coil and a resonant inductor (Lr). A small AC capacitor (Cr) is connected in series (or possibly in parallel) with this coil (an inductor) as shown in FIG. 13 (FIG. 13b shows a circuit diagram 1311 of FIG. 13a) to form a resonant tank, which is then connected to the diode rectifier with a DC capacitor (Cdc). The diode rectifier turns the resonant AC voltage picked up by the resonant tank into a DC voltage and the DC capacitor reduces the voltage ripple in order to maintain a fairly stiff DC voltage for the charging circuit. It should be noted that the diode rectifier can be of a standard type as shown in FIG. 13(b), or it can be of a type 1312 with voltage doubling (sometimes called voltage doubler) as shown in FIG. 13(c). The use of a voltage regulator can ensure a stable DC voltage for charging the battery.

The use of the small resonant capacitor (Cr) is very important. The resonant frequency (fr) of the resonant tank formed by Lr and Cr can be expressed as:

$$f_r = \frac{1}{2\pi\sqrt{L_r \cdot C_r}}$$

The use of this additional resonant capacitor offers a designer the freedom to select the appropriate operating frequency for the entire charging system in order to optimize the system performance for meeting various requirements and international standards. It has been explained in WO03/105308 that the primary circuit (i.e. equivalent circuit of the inductive battery charging platform) is essentially a L-C resonant circuit. By choosing the resonant frequencies of both primary and secondary resonant circuits to be identical or as close as possible, energy transfer between them can be optimized. With the use of a core-based planar inductor in this proposal, the inductance value of Lr can be much greater than that of a coreless spiral winding as in the prior art. Therefore, according to the above equation, the resonant frequencies of both of the primary and secondary circuit can be selected at a relatively low frequency range (e.g. 100 kHz to 450 kHz) instead of 950 kHz as in the case of the prior art.

When placed on the charging platform, the charged electronic equipment has the active side of the battery pack near and parallel to the charging surface of the charging platform, which produces a magnetic flux flowing in and out of the charging surface perpendicularly. By Faraday's law, an AC voltage will be induced in the secondary winding. In this invention, the two terminals of the secondary resonant tank are connected to a diode rectifier and a capacitor as shown in FIG. 13. The use of this diode rectifier and a smoothing capacitor is important. Firstly, the diode rectifier turns the induced AC voltage in the winding into a rectified DC voltage and the DC capacitor reduces the AC voltage ripple so that a fairly constant DC voltage can be made available for the charging protection circuit. Secondly, the diode rectifier prevents any current from flowing into the secondary resonant tank 1400 formed by Lr and Cr when a traditional battery charger is plugged into the charged equipment. This feature can be explained with the use of the block diagram as shown in FIG. 14. As the introduction of the proposed inductive charging device should not affect the use of a traditional power adaptor, it is important that the new circuit should allow the electronic equipment to be charged by both a planar inductive charging platform and a traditional power adaptor. If a traditional power adaptor 1402 is plugged into the charging socket of the electronic equipment, the terminals DC+ 1404 and DC− 1406 will be connected to IN+ 1408 and IN− 1410 of the battery pack through the mechanical contacts in the charging socket. The presence of the diode rectifier is crucial here because it prevents any current from the traditional power adaptor from flowing into the "secondary winding".

A further proposal in this invention is to incorporate the resonant capacitor Cr, the diode rectifier and the DC capacitor Cdc into the existing charging protection circuit as shown in FIG. 15. In this way, the two terminals 1500, 1502 of the secondary winding can simply be connected to the inputs of the modified charging protection circuit 1504. The DC power terminals 1506, 1508 of a traditional power adaptor or charger, if used, will be connected to IN+ 1510 and IN− 1512 of the modified circuit as usual (FIG. 15). This arrangement further simplifies the manufacturing process of the battery pack that will now become compatible with the inductive battery charging platform of FIG. 2 with perpendicular magnetic flux as well as a traditional power adaptor.

FIG. 16 shows the component parts of the proposed battery pack including a battery pack casing 1600, battery 1602, a soft magnetic sheet 1604 with winding 1606 placed on top of the battery, a cover 1608 for the active side of the battery pack, and a modified charging and protection circuit 1610 including the extra diode rectifier and capacitors described with respect to FIG. 15. FIGS. 17(*a*) and 17(*b*) show the simple assembling process of these parts for a battery pack 1700. As long as the "active side" of the battery pack faces the surface of the charging platform, the electronic equipment (e.g., 1800, 1802) can be charged by the planar inductive charging platform 1804 as shown in FIG. 18. It should be noted that the proposed device in FIG. 11 and FIG. 12 can be a separate device or can be integrated into a battery pack (FIG. 17) as explained above. When used as a separate device (FIG. 13), it can be used to make existing electronic equipment compatible with the inductive charging platform.

The equivalent circuit 1900 of this invention when used with the planar inductive charger is shown in FIG. 19. Unlike that reported by Choi (FIG. 5), the multilayer winding array that generates a uniform magnetic field over the charging surface (primary system) can be represented as groups of windings that can be connected to the high-frequency AC inverter in series, in parallel or a combination of both. When the secondary loads are placed on the charging surface, near field coupling and therefore energy transfer occur between the charging platform and the secondary loads.

In summary, at least in its preferred forms this invention has the following advantageous features. The use of the proposed inductive charging device is simple and comprises only a thin sheet of soft magnetic material, a winding, a small AC capacitor, a diode rectifier and a DC capacitor (and an optional voltage regulator). The invention is particularly useful for use with any charging platform (such as that shown in WO03/105308 but not limited thereto) that provides magnetic flux "perpendicular" to the charging surface, the entire area of the proposed device can be used to pick up the AC flux. For the same reason, the structure of the proposed device can be of low-profile (i.e. very thin, less than 1 mm), making it easy to mount the proposed planar device on the active side of the battery inside a battery pack without increasing the overall thickness of the battery pack substantially. This low-profile device can be used as a separate circuit to make existing batteries compatible with the planar inductive battery charger or can be integrated into new battery packs. The secondary resonant tank allows a relatively low switching frequency to be chosen so as to optimize the charging performance such as improved energy efficiency and energy transfer; reduced AC resistance and EMI emission. The proposed device can be added to existing battery pack externally or integrated into existing charging protection circuit inside the battery pack. If a voltage doubler is used as the diode rectifier, a high voltage generated for the charging circuit can be higher than that of a standard diode bridge.

The invention claimed is:

1. A battery pack for an electronic device comprising: one or more battery cells, a battery charging circuit, an energy receiving element adapted to receive power from a planar inductive charging system, said energy receiving element having an inductance, a capacitor connected to said energy receiving element and forming a resonant tank therewith, and a diode rectifier and a DC capacitor connected to the energy receiving element to provide a rectified DC voltage that can be fed from the energy receiving element to said battery charging circuit, wherein said energy receiving element comprises a generally planar thin soft magnetic sheet and a first coil wound circumferentially around the edge of said sheet such that the coil lies in a plane defined by said magnetic sheet.

2. A battery pack as claimed in claim 1 wherein said capacitor is connected in series with said first coil and forms said resonant tank with said first coil and said magnetic sheet.

3. A battery pack as claimed in claim 1, further comprising a secondary energy receiving element comprising a second coil formed in a plane parallel to said soft magnetic sheet and wherein said second coil is connected in parallel with said first coil.

4. A battery pack as claimed in claim 3 wherein said second coil is formed on a printed circuit board.

5. A battery pack as claimed in claim 4 wherein said printed circuit board is fixed to said soft magnetic sheet.

6. A battery pack as claimed in claim 1 wherein said energy receiving element comprises a coil formed on a printed circuit board.

7. A battery pack as claimed in claim 1 wherein said diode rectifier is a voltage doubler.

8. A battery pack as claimed in claim 1 wherein said diode rectifier and said DC capacitor are formed as part of the battery charging circuit.

9. A battery pack as claimed in claim 1 further comprising a voltage regulator for regulating the output of the rectifier to the battery charging circuit.

10. An electronic device powered by a battery pack, said battery pack comprising one or more battery cells and a battery charging circuit, said device comprising a housing, means for connecting said battery charging circuit to an external power adaptor, and said device further comprising an energy receiving element adapted to receive power from a planar inductive charging system and for supplying power to said battery charging circuit, said energy receiving element having an inductance, and an capacitor connected to said energy receiving element and forming a resonant tank therewith, wherein said energy receiving element comprising a generally planar thin soft magnetic sheet located on a side of said battery pack facing a side of said housing adapted to be received on a said planar inductive charging system and a first coil wound circumferentially around the edge of said sheet such that the coil lies in a plane defined by said magnetic sheet.

11. An electronic device as claimed in claim 10 further comprising a secondary energy receiving element comprising a second coil formed in a plane parallel to said soft magnetic sheet and wherein said second coil is connected in parallel with said first coil.

12. An electronic device as claimed in claim 11 wherein said second coil is formed on a printed circuit board.

13. An electronic device as claimed in claim 12 wherein said printed circuit board is fixed to said soft magnetic sheet.

14. An electronic device as claimed in claim 10 wherein said capacitor is connected in series with said first coil and forms a resonant tank with said first coil and said magnetic sheet.

15. An electronic device as claimed in claim 10 wherein said energy receiving element comprises a coil formed on a printed circuit board.

16. An electronic device as claimed in claim 10 wherein said diode rectifier is a voltage doubler.

17. An electronic device as claimed in claim 10 wherein said diode rectifier and said DC capacitor are formed as part of the battery charging circuit.

18. An electronic device as claimed in claim 10 further comprising a voltage regulator for regulating the output of the rectifier to the battery charging circuit.

19. An energy receiving element adapted to be fixed to a battery pack to enable said battery pack to be charged from a planar inductive battery charging system, said energy receiving element comprising an AC capacitor, wherein said energy receiving element has an inductance and forms a resonant tank with the AC capacitor, and wherein said energy receiving element comprises a generally planar thin soft magnetic sheet and a first coil wound circumferentially around the edge of said sheet such that the coil lies in a plane defined by said magnetic sheet.

20. An energy receiving element as claimed in claim 19 further comprising a second coil formed as a spiral in a plane parallel to said soft magnetic sheet and wherein said second coil is connected in parallel with said first coil.

21. An energy receiving element as claimed in claim 20 wherein said second coil is formed on a printed circuit board.

22. An energy receiving element as claimed in claim 21 wherein said printed circuit board is fixed to said soft magnetic sheet.

23. An energy receiving element as claimed in claim 19 further comprising a diode rectifier and a DC capacitor to provide a rectified DC voltage that can be fed from the energy receiving element to a battery charging circuit of said battery pack.

24. An energy receiving element as claimed in claim 19 further comprising a voltage regulator for regulating the output of the rectifier to the battery charging circuit.

25. An energy receiving element as claimed in claim 19 comprising a coil formed on a printed circuit board.

26. An energy receiving element adapted to be fixed to a battery pack to enable said battery pack to be charged from a planar inductive battery charging system, said energy receiving element comprising a generally planar thin soft magnetic sheet and a first coil wound circumferentially around the edge of said sheet such that the coil lies in a plane defined by said magnetic sheet.

27. An energy receiving element as claimed in claim 26 further comprising a capacitor connected in series with said first coil and forming a resonant tank with said first coil and said magnetic sheet.

28. An energy receiving element as claimed in claim 26 further comprising a diode rectifier and a DC capacitor connected to the first coil to provide a rectified DC voltage that can be fed from the energy receiving element to a battery charging circuit of said battery pack.

29. An energy receiving element as claimed in claim 28 wherein said diode rectifier is a voltage doubler.

30. An energy receiving element as claimed in claim 26 further comprising a second coil formed as a spiral in a plane parallel to said soft magnetic sheet and wherein said second coil is connected in parallel with said first coil.

31. An energy receiving element as claimed in claim 30 wherein said second coil is formed on a printed circuit board.

32. An energy receiving element as claimed in claim 31 wherein said printed circuit board is fixed to said soft magnetic sheet.

33. An energy receiving element as claimed in claim 26 further comprising a voltage regulator for regulating the output of the rectifier to the battery charging circuit.

* * * * *

UNITED STATES PATENT AND TRADEMARK OFFICE
CERTIFICATE OF CORRECTION

PATENT NO. : 7,495,414 B2
APPLICATION NO. : 11/234045
DATED : February 24, 2009
INVENTOR(S) : Ron Shu-yuen Hui It is certified that error appears in the above-identified patent and that said Letters Patent is hereby corrected as shown below:

On the Title Page Item (73) Assignee:

"Convenient Power Limited, Central (HK)" should read --City University of Hong Kong, Kowloon (HK)--

Signed and Sealed this

Fourth Day of May, 2010

David J. Kappos
*Director of the United States Patent and Trademark Office*